(12) United States Patent
Tamura et al.

(10) Patent No.: US 8,450,230 B2
(45) Date of Patent: May 28, 2013

(54) DIELECTRIC CERAMIC COMPOSITION AND ELECTRONIC COMPONENT

(75) Inventors: Masayuki Tamura, Tokyo (JP); Satoshi Takagi, Tokyo (JP); Dan Sakurai, Tokyo (JP); Sanshiro Aman, Tokyo (JP); Yuki Kamada, Tokyo (JP)

(73) Assignee: TDK Corporation, Tokyo (JP)

( * ) Notice: Subject to any disclaimer, the term of this patent is extended or adjusted under 35 U.S.C. 154(b) by 289 days.

(21) Appl. No.: 12/978,950

(22) Filed: Dec. 27, 2010

(65) Prior Publication Data

US 2011/0164346 A1 Jul. 7, 2011

(30) Foreign Application Priority Data

Jan. 4, 2010 (JP) ................................. 2010-000183

(51) Int. Cl.
*C04B 35/468* (2006.01)
(52) U.S. Cl.
USPC .................. 501/139; 361/321.4; 428/701
(58) Field of Classification Search
USPC .................. 501/139; 428/701; 361/321.4
See application file for complete search history.

(56) References Cited

U.S. PATENT DOCUMENTS

| 6,331,932 | B1 | 12/2001 | Kobayashi et al. | |
|---|---|---|---|---|
| 7,008,894 | B2 * | 3/2006 | Sasaki et al. | 501/138 |
| 8,192,851 | B2 * | 6/2012 | Aman et al. | 428/701 |
| 2003/0191011 | A1 * | 10/2003 | Sasaki et al. | 501/137 |
| 2008/0226944 | A1 * | 9/2008 | Aman et al. | 428/697 |

FOREIGN PATENT DOCUMENTS

| JP | A-2000-223351 | 8/2000 |
|---|---|---|
| JP | A-2008-81350 | 4/2008 |
| JP | A-2008-179493 | 8/2008 |

* cited by examiner

*Primary Examiner* — Karl Group
(74) *Attorney, Agent, or Firm* — Oliff & Berridge, PLC

(57) ABSTRACT

A dielectric ceramic composition comprises a main component composed of at least one selected from $BaTiO_3$, $(Ba,Ca)TiO_3$, $(Ba,Sr)TiO_3$ and $(Ba,Ca,Sr)TiO_3$, an oxide of rare earth element and a composite compound including Ba. 9 to 13 mol of the composite compound in terms of composite compound is included in the dielectric composition. The dielectric ceramic composition includes surface diffusion particles having surface diffusion structure composed of non diffusion phase and diffusion phase including rare earth element. In the surface diffusion particle, when an area of the non diffusion phase is defined as S1, an area of the diffusion phase is defined as S2, S1 and S2 satisfy a relation of S1:S2=20:80 to 30:70 (Note that, except S1=30 and S2=70), when an average concentration of the rare earth element in the surface diffusion particle is defined as C, S2 and C satisfy a relation of $4.8 \leq S2 \times C \leq 5.8$. By the present invention, dielectric ceramic composition which improves reliability with obtaining good specific permittivity and temperature characteristic and electronic component to which the dielectric ceramic composition is applied can be obtained.

9 Claims, 3 Drawing Sheets

DIELECTRIC CERAMIC COMPOSITION AND ELECTRONIC COMPONENT

BACKGROUND OF THE INVENTION

1. Field of the Invention

The present invention relates to a dielectric ceramic composition and an electronic component, more precisely relates to a dielectric ceramic composition which improves reliability with maintaining good specific permittivity and furthermore shows good temperature characteristics, and an electronic component to which said dielectric ceramic composition is applied.

2. Description of the Related Art

In recent years, there is a high demand for downsizing electronic components along with making progress in high density of electronic circuit. With a rapid progress in downsizing and increasing capacitance of a multilayer ceramic capacitor, applications are expanding, and there is various required properties.

For example, for a mid-high voltage capacitor used for apparatus such as ECM (Engine Electric Computer Module), fuel injection device, electronic controlled throttle, inverter, convertor, HID headlamp unit, battery control unit of hybrid engine, digital still camera and the like, it is required to be used under high electric field strength and have high reliability.

Conventionally, in order to improve reliability, it has been developed a dielectric ceramic composition to which paraelectrics such as barium zirconate and the like is added, However, in recent years, further higher reliability is required.

In the meantime, Japanese Patent Laid Open No. 2000-223351 discloses a multilayer ceramic capacitor wherein temperature characteristic, specific permittivity and high temperature load lifetime are improved by setting an area ratio of core and shell in a specific range in a dielectric ceramic particle having core-shell structure.

However, the multilayer capacitor disclosed in Japanese Patent Laid Open No. 2000-223351 is insufficient for improving reliability, thus further improvement has been required.

BRIEF SUMMARY OF THE INVENTION

The present invention has been made by considering such situation, and a purpose of the invention is to provide a dielectric ceramic composition which improves reliability with maintaining good specific permittivity and furthermore shows good temperature characteristics, and an electric component to which said dielectric ceramic composition is applied.

In order to achieve the above purposes, a dielectric ceramic composition according to the present invention comprises a main component composed of one selected from $BaTiO_3$, $(Ba, Ca) TiO_3$, $(Ba, Sr) TiO_3$ and $(Ba, Ca, Sr) TiO_3$, an oxide of R element, where R element is at least one selected from Sc, Y, La, Ce, Pr, Nd, Pm, Sm, Eu, Gd, Tb, Dy, Ho, Er, Tm, Yb and Lu, and a composite compound including Ba. In the dielectric ceramic composition, 9 to 13 mol of the composite compound in terms of composite compound is included with respect to 100 mol of the main component. The dielectric ceramic composition includes a surface diffusion particle having surface diffusion structure which is composed of non diffusion phase and diffusion phase existing around the non diffusion phase and including at least the R element. In the surface diffusion particle, when an area occupied by the non diffusion phase is defined as S1, an area occupied by the diffusion phase is defined as S2, S1 and S2 satisfy a relation of S1:S2=20:80 to 30:70 (Note that, except S1=30 and S2=70), when an average concentration of the R element in the surface diffusion particle is defined as C, S2 and C satisfy a relation of $4.8 \leqq S2 \times C \leqq 5.8$.

In the present invention, in the surface diffusion particle having surface diffusion structure composed of the non diffusion phase consisting of substantially main component and the diffusion phase including R element, the area of the non diffusion phase is set relatively smaller and the area of the diffusion phase is set relatively larger. However, when enlarging only the area of diffusion phase relatively, although the reliability such as high temperature load lifetime and the like is improved, the specific permittivity tends to be reduced.

Therefore, in addition, in the present invention, a value ($S2 \times C$) multiplied the area of the diffusion phase (S2) by the average concentration of the R element (C) in the surface diffusion particle is set in specific range. The "$S2 \times C$" shows an absolute (total) content rate of the R element in the diffusion phase.

Thus, when the area of diffusion phase is relatively smaller, the R element is controlled to be included relatively larger in the diffusion phase, and when the area of the diffusion phase is relatively larger, the R element is controlled to be included relatively smaller in the diffusion phase, instead of merely changing the area of diffusion phase.

By doing this, the dielectric ceramic composition which improves reliability with suppressing reduction of specific permittivity and furthermore shows good temperature characteristic can be obtained.

Preferably, the composite compound including the Ba is barium zirconate. By doing this, an area ratio of the non diffusion phase and the diffusion phase can be easily controlled with improving the reliability such as high temperature load lifetime and the like.

Preferably, in the dielectric composition, 4.5 to 5.5 mol of oxide of the R element in terms of $R_2O_3$ is included with respect to 100 mol of the main component.

By setting content amount of the oxide of R element in the above mentioned range, effects of the present invention can be improved further.

Preferably, in the dielectric composition, with respect to 100 mol of said main component, 2.7 to 5.7 mol of oxide of Mg in terms of MgO is included; 0.5 to 1.5 mol of oxide of at least one element selected from Mn, Cr, Co and Fe in terms of MnO, $Cr_2O_3$, $Co_3O_4$ and $Fe_2O_3$ is included; 3.0 to 3.9 mol of oxide of at least one element selected from Si, Al, Ge, B and Li in terms $SiO_2$, $Al_2O_3$, $GeO_2$, $B_2O_3$ and $Li_2O$ is included. By using dielectric ceramic composition having such composition, the effects of the present invention can be improved further.

An electronic component according to the present invention is an electronic component having a dielectric layer and an electrode layer and the dielectric layer is composed of any one of the above mentioned dielectric ceramic composition.

Although the electronic component having the dielectric layer to which the dielectric ceramic composition according to the present invention is suitably applied is not particularly limited, multilayer ceramic capacitor, piezo element, tip inductor, tip varistor, tip thermistor, tip resister and other surface mounted device (SMD) tip type electronic component are exemplified.

Normally, in dielectric particle, when an area of non-diffusion phase becomes larger, specific permittivity and the like become larger while reliability such as high temperature load lifetime and the like tend to be reduced. On the other hand, when an area of diffusion phase becomes larger, a specific permittivity and the like tend to be smaller even though the reliability was improved.

Therefore, it was very hard to achieve a good balance between the above mentioned characteristics by only controlling the areas of non diffusion phase and diffusion phase.

However, according to the present invention, not only by controlling the areas of non diffusion phase and diffusion phase, but also by controlling the absolute content ratio of the R element in the diffusion phase, the dielectric ceramic composition which achieves a good balance between the above mentioned characteristics and furthermore shows good temperature characteristic can be obtained.

DETAILED DESCRIPTION OF THE INVENTION

Figure 1:
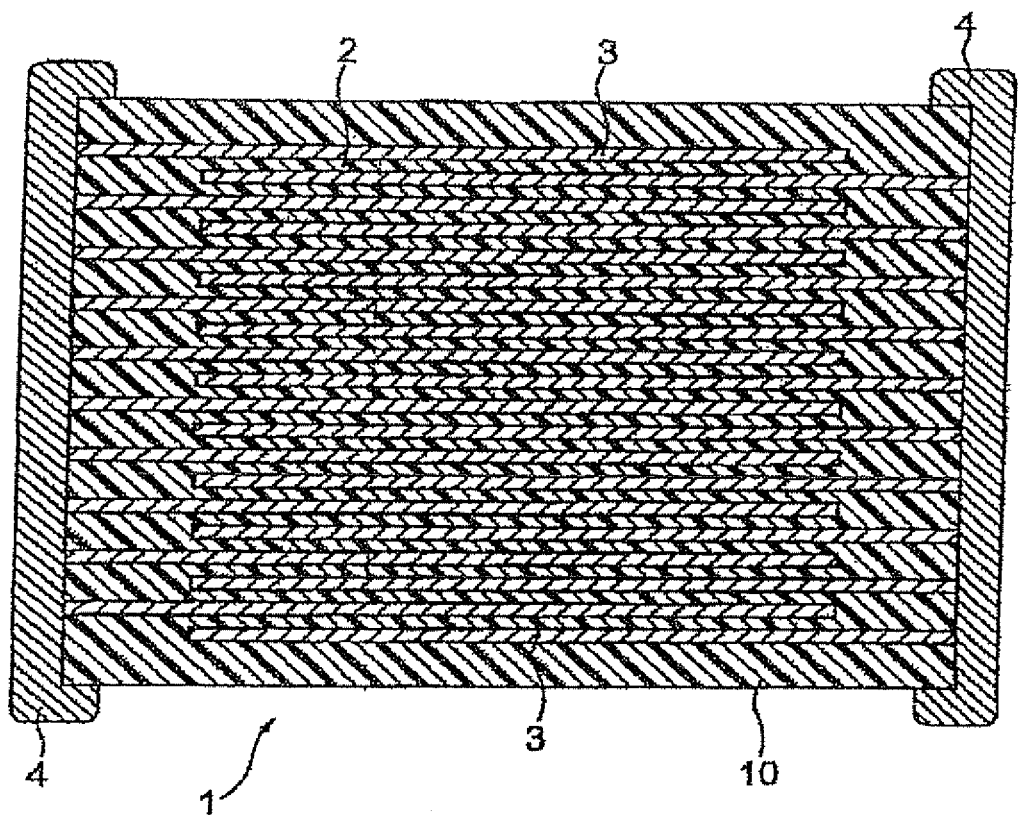
FIG. 1 is a cross sectional view of a multilayer ceramic capacitor according to one embodiment of the present invention.

Below, the present invention will be explained based on embodiments shown in the drawings.
(Multilayer Ceramic Capacitor 1)

As shown in FIG. 1, a multilayer ceramic capacitor 1 according to one embodiment of the present invention comprises a capacitor element body 10 in which a dielectric layer 2 and an internal electrode layer 3 are alternately stacked. At both side ends of the capacitor element body 10, a pair of external electrode 4, which connects with each internal electrode layer 3 alternately arranged inside of the element body 10, is formed. Although the shape of the capacitor element body 10 is not particularly limited, normally, it is formed as a rectangular parallelepiped shape. Also, a dimension thereof is not particularly limited, it may be decided appropriately depending on the use.
(Dielectric Layer 2)

A dielectric layer 2 comprises a dielectric ceramic composition of the present invention. The dielectric ceramic composition of the present invention includes a main component composed of one selected from $BaTiO_3$, (Ba, Ca) $TiO_3$, (Ba, Sr) $TiO_3$ and (Ba, Ca, Sr) $TiO_3$, and an oxide of R element, where R element is at least one selected from Sc, Y, La, Ce, Pr, Nd, Pm, Sm, Eu, Gd, Tb, Dy, Ho, Er, Tm, Yb and Lu, and a composite compound including Ba. Here, an amount of oxygen (O) may be slightly deviated from stoichiometry composition of the above formula.

The main component is, specifically, compound shown by a compositional formula $(Be_{1-x-y}Ca_xSr_y) TiO_3$ and having perovskite type crystal structure. As for the main component, barium titanate is particularly preferable.

In the present embodiment, the "x" in the above formula is preferably $0 \leq x \leq 0.1$. The "x" shows number of Ca atoms, and a capacitance temperature coefficient and a specific permittivity can be controlled arbitrary by setting the "x" is within the above range. When the "x" is too large, the specific permittivity tends to be reduced. In the present embodiment, the Ca may not be included necessarily.

In the present embodiment, the "y" in the above formula is preferably $0 \leq y \leq 0.1$. The "y" shows number of Sr atoms, a temperature characteristic can be improved by setting the "y" is within the above range. When the "y" is too large, the specific permittivity tends to be reduced. In the present embodiment, the Sr may not be included necessarily.

The oxide of R has mainly an effect to suppress ferroelectricity of the main component compound. A content amount of the oxide of R in terms of $R_2O_3$ is preferably 4.5 to 5.5 mol, more preferably 4.7 to 5.5 mol with respect to 100 mol of the main component. When the content amount of the oxide of R is too low, electrostriction characteristic and DC bias characteristic are deteriorated and further high temperature load lifetime tends to be deteriorated. Note that, as for the R element composing the above mentioned oxide of R, at least one selected from Gd, Tb, Eu, Y, La and Ce is preferable. Among them, the Gd is particularly preferable, because good temperature characteristic can be obtained.

A compound having Ba is included for controlling an area of diffusion phase mentioned below. It is not particularly limited as far as it is a component which is able to solid-solute (diffused) easily in particles of the main component and accelerate formation of the diffusion phase. In the present embodiment, at least one selected from $BaZrO_3$, $BaCO_3$ and $BaSiO_3$ is preferable. Among them, barium zirconate ($BaZrO_3$) is particularly preferable, because it has perovskite type crystal structure and a large effect for improving the high temperature load lifetime. A content amount of the compound in terms of the compound is preferably 9 to 13 mol, more preferably 10 to 12 mol with respect to 100 mol of the main component. When the content amount of said compound is too low, the electrostriction characteristic and DC bias characteristic tend to be deteriorated, on the other hand, when it is too large, the specific permittivity tends to be lowered.

Note that, in the present embodiment, other components may be included if needed.

Specifically, for example, an oxide of Mg may be included. A content amount of the oxide of Mg in terms of MgO is preferably 2.7 to 5.7 mol, more preferably 4.0 to 5.7 mol with respect to 100 mol of the main component. The oxide of Mg has mainly an effect to suppress ferroelectricity of the main component compound. When a content amount of the oxide of Mg, the temperature characteristic at the time of applying voltage tends to be deteriorated, on the other hand, when it is too large, the specific permittivity tends to be reduced.

Also, at least one oxide of element selected from Mn, Cr, Co and Fe may be included. A content amount of these oxides in terms of MnO, $Cr_2O_3$, $Co_3O_4$ and $Fe_2O_3$ is preferably 0.5 to 1.5 mol, more preferably 0.7 to 1.2 mol with respect to 100 mol of the main component. When a content amount of the oxide is too low or too large, an insulation resistance tends to be decreased. Note that, among the above mentioned oxides, the oxide of Mn is preferably used, in view of improving characteristics.

Also, at least one of oxide of element selected from Si, Al, Ge, B and Li may be included. A content amount of the oxide in terms of $SiO_2$, $Al_2O_3$, $GeO_2$, $B_2O_3$ and $Li_2O$ is preferably 3.0 to 3.9 mol with respect to 100 mol of the main component. When the content amount of said oxide is too low, a sintering property tends to be deteriorated. On the other hand, when it is too large, the specific permittivity tends to be lowered. Note that, it is preferable to use the oxide of Si, in view of improving characteristics. Note that, in the case that the oxide of Si is included, a form is not particularly limited, for example, it may be included as $SiO_2$ form or it may be included as a form of a composite oxide such as (Ba, Ca)$SiO_3$ and the like.
(Structure of Dielectric Particle)

In the present embodiment, at least a part of dielectric particles included in the above mentioned dielectric layer 2 becomes surface diffusion particle 20 having surface diffusion structure. The surface diffusion particle 20 is a particle that the R element and elements composing the composite compounds including Ba in the main component particles are solid-soluted (diffused). Also, a crystal grain boundary exists between adjacent particles.

Figure 2:
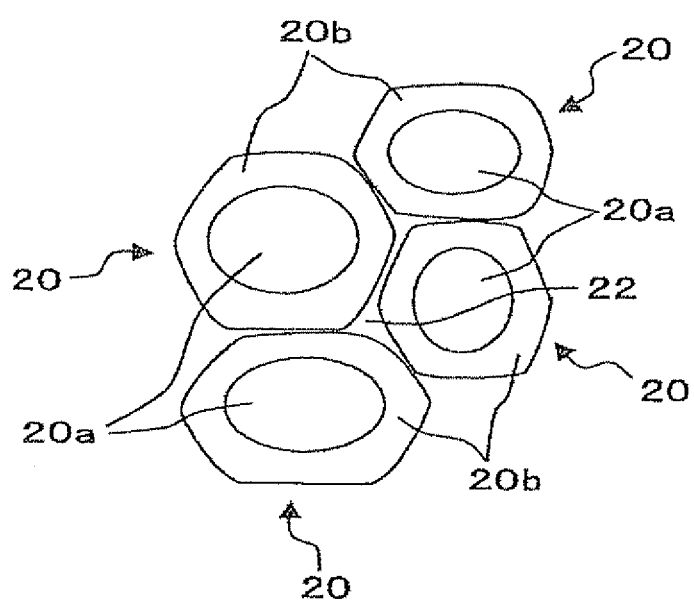
FIG. 2 is an enlarged cross sectional view of a main part of a dielectric layer 2 shown in FIG. 1.

As shown in FIG. 2, the surface diffusion particle 20 is composed of the non diffusion phase 20a which is substantially composed of the main component, and the diffusion phase 20b which exists around the non diffusion phase 20a and including components other than element composing the main component diffused in the main component.

Since the non diffusion phase 20a is substantially composed of the main component, it shows a ferroelectric characteristic. On the other hand, since the oxides of R element and the composite compound including Ba are diffused (solid-soluted) to the main component in the diffusion phase 20b, the ferroelectric characteristic is lost and shows a paraelectrics characteristic. In the present embodiment, not only the R element and the elements composing the composite compound, but also other element may exist in non diffusion phase 20b.

Whether the dielectric particle have the above mentioned surface diffusion structure or not may be decided from, for example, whether two phases which shows different contrast are observed or not in the dielectric particles in a bright field image by a scanning transmission electron microscope (STEM). Alternatively, it may be decided from a concentration distribution of elements other than element composing the main component in the dielectric particle by using an energy dispersive X-ray spectrometer equipped to a transmission electron microscope (TEM).

An existence ratio of the surface diffusion particle 20 having the above mentioned configuration is preferably 90 to 100% in a number ratio, when a number of whole dielectric particles composing the dielectric layer 2 is 100%.

Note that, in the above, whether the surface diffusion particle 20 exists or not is decided by contrast of elements which solid-solute (diffused) to the main component in a cross sectional photo of the dielectric layer 2. However, in fact, among the particles being the surface diffusion particles 20, there is some particles which seem to have only diffusion phase in the cross sectional photo. In the case of this, such particles are not decided as the surface diffusion particle 20, thus an upper limit of a rate of the surface diffusion particle 20 is apparently 80% or so.

Figure 3:
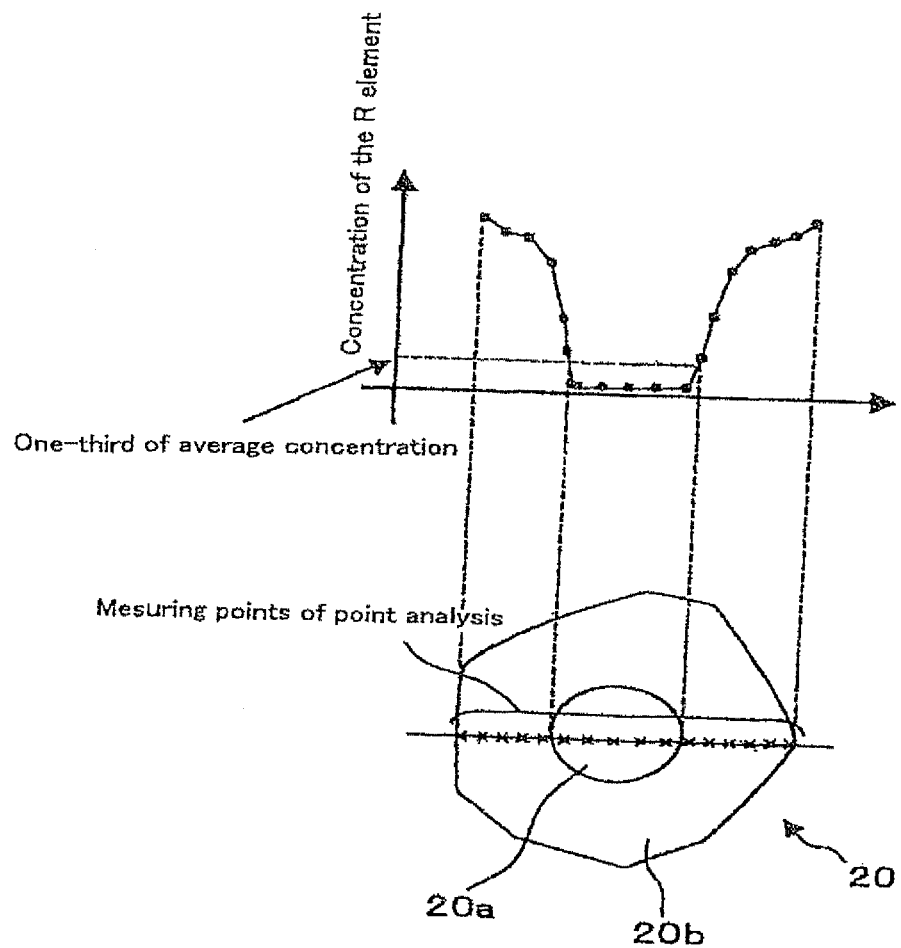
FIG. 3 is a schematic view for explaining a method for distinguishing a non diffusion phase and diffusion phase in a surface diffusion particle in the multilayer ceramic capacitor according to one embodiment of the present invention.

For the particles which are decided as the surface diffusion particle 20, the areas of non diffusion phase 20a and diffusion phase 20b are measured. Although a method for measuring the areas is not particularly limited, in the present embodiment, for example, they can be measured as follows. Firstly, a predetermined number of the surface diffusion particles are observed by the scanning transmission electron microscope (STEM), and, as shown in FIG. 3, point analysis in a linear line which through an about center of the surface diffusion particle 20 is performed by using an equipped energy dispersive X-ray spectrometer. Then, an average concentration of the R element (C) in the whole particles (non-diffusion phase 20a and diffusion phase 20b) is calculated from the obtained concentration distribution of the R element.

Then, by performing image processing for a mapping image of the R element of the surface diffusion particle 20, and the dielectric particle is divided to an area where the average concentration of R element is more than one-third (⅓) and an area where the average concentration of the R element is one-third (⅓) or less. Namely, the area where the average concentration is more than one-third is defined as the diffusion phase 20b, the area where the average concentration is one-third or less is defined as non diffusion phase 20a. As such, the boundary defined by the above and the boundary between the non-diffusion phase 20a and diffusion phase 20b of the particle which is observed as a difference of contrast in the bright field image by a scanning transmission electron microscope (STEM) are well conformed.

Next, the areas of non, diffusion phase 20a and the diffusion area 20b which are clearly distinguished by the above image processing are calculated. In the present embodiment, when the area occupied by the non-diffusion phase 20a is defined as S1, the area occupied by the diffusion phase 20b is defined as S2, S1 and S2 satisfy a relation of S1:S2=20:80 to 30:70 (note, except for S1=30 and S2=70), preferably S1:S2=20:80 to 28:72. By setting an area ratio of the non-diffusion phase and diffusion phase in the above range, reliability can be improved.

Further, in the present embodiment, by controlling concentration of the R element in the diffusion phase and setting the total amount of the R element existing in the diffusion phase in the specific range, the dielectric ceramic composition maintains good specific permittivity and temperature characteristic and achieves a good balance among specific permittivity, temperature characteristic and reliability.

In the present embodiment, the total amount of the R element existing in the diffusion phase is defined as a value multiplied the area of the diffusion phase (S2) by the average concentration of the R element (C) in the diffusion phase. Hereinafter, this value is also mentioned as "absolute content ratio of the R element (S2×C)". The absolute content ratio of the R element is $4.8 \leq S2 \times C \leq 5.8$, preferably $4.9 \leq S2 \times C \leq 5.3$.

Note that, in the above, although the average concentration of the R element (C) is measured when calculating areas of the non diffusion phase and the diffusion phase, it may be calculated by performing a different measurement from the above.

The above mentioned area ratio of the non diffusion phase 20a and the diffusion phase 20b, and the absolute content ratio of the R element can be achieved, which is specified below, by controlling diffusion of Component which is easily solid-soluted and the R element with controlling firing conditions and content amount of the R element or so. Particularly, it is preferable to control diffusion of component which is easily solid-soluted to the main component (for example, $BaZrO_3$).

An average crystal grain size of the dielectric particle included in the dielectric layer 2 is measured as follows. Namely, the capacitor element body 10 is cut towards stacking direction of the dielectric layer 2 and the internal electrode layer 3, and an average area of the dielectric particle in the cross section is measured, a diameter is calculated as a circle equivalent diameter and a crystal grain size is defined as the diameter multiplied by 1.5. This crystal grain size is measured for more than 200 of the dielectric particles, a value to which the accumulation from the cumulative frequency distribution of the obtained grain size becomes 50% is defined as the average crystal grain size (unit: μm).

In the present embodiment, although the average crystal grain size may be decided depending on a thickness of the dielectric layer 2, preferably it is 0.8 μm or below.

(Internal Electrode Layer 3)

Although a conductive material included in the internal electrode layer 3 shown in FIG. 1 is not particularly limited, comparatively inexpensive base metal may be used, because the material constituting the dielectric layer 2 has resistance to reduction. As for the base metal of the conductive material, Ni or Ni alloy is preferable. As for the Ni alloy, an alloy of at least one kinds of element selected from Mn, Cr, Co and Al with Ni, and Ni content amount in the alloy is preferably 95 wt % or more. Note that, in the Ni or Ni alloy, 0.1 wt % or below or so of various miner component such as P and the like may be included. Also, the internal electrode layer 3 may be formed by using a commercial electrode paste. A thickness of the internal electrode layer may be suitably decided depending on a purpose of use and the like.

(External Electrode 4)

Although a conductive material included in an external electrode 4 shown in FIG. 1 is not particularly limited, in the present embodiment, inexpensive Ni, Cu and their alloys may be used. A thickness of the external electrode may be suitably decided depending on a purpose of use and the like.

(Producing Method for Multilayer Ceramic Capacitor 1)

A multilayer ceramic capacitor 1 of the present embodiment is produced by, as similar with a conventional multilayer ceramic capacitor, producing a green chip by a normal printing method or sheet method using a paste, then firing thereof, and firing after printing or transferring an external electrode. Below, a method for producing will be explained specifically.

Firstly, dielectric material (dielectric ceramic composition powder) included in a dielectric layer paste is prepared, and made into paste to prepare the dielectric layer paste.

As for the dielectric material, the above mentioned main component and oxide other than the main component, mixtures thereof or composite oxide can be used. Also, other than these, various compounds which become the above mentioned oxide or composite oxide by firing may be used, for example, it may be suitably selected from carbonate, oxalate, nitrate, hydroxide or organic metal compounds, and mixtures of thereof may be used For example, as for a raw material of $BaTiO_3$, $BaTiO_3$ may be used, or $BaCO_3$ and $TiO_2$ may be used as well. Also, as for a raw material of $BaZrO$, $BaZrO_3$ may be used, or $BaCO_3$ and $ZrO_2$ may be used as well.

A content amount of the each oxide in the dielectric material may be decided so as to be composition of the above mentioned dielectric ceramic composition after firing. Particle size of the dielectric material is, in normally, 0.1 to 1 μm of average particle size or so before made into paste.

Barium titanate raw material powder as the main component raw material may be used as produced by various methods such as various liquid phase methods (for example, oxalate method, hydrothermal synthesis method, alcoxide method, sol-gel method and the like) as well as so-called solid phase method. Also, although raw materials other than the main component may be added to the main component raw material so as to prepare the dielectric material, it is preferable that the raw materials other than the main component are calcined, and that the calcined raw materials are added to the main component raw material so as to prepare the dielectric material.

Next, a dielectric layer paste is prepared by making the dielectric material into a paste. The dielectric layer paste may be an organic type paste obtained by kneading the dielectric material and an organic vehicle, or a water-based paste.

The organic vehicle is obtained by dissolving a binder in an organic solvent. The binder used for the organic vehicle is not particularly limited, it may be suitably selected from various normal binders such as ethyl cellulose, polyvinyl butyral and the like. Also, the organic solvent is not particularly limited, it may be suitably selected from various solvents such as terpineol, butyl carbitol, acetone, toluene and the like depending on the method such as printing method or sheet method.

Also, when preparing the dielectric layer paste as water-based paste, a water-based vehicle obtained by dissolving a water soluble binder, dispersion agent and the like in water, and the dielectric material may be kneaded. The water-soluable binder used for the water-based vehicle is not particularly limited, for example, polyvinyl alcohol, cellulose, water-soluble acrylic resin and the like can be used.

An internal electrode layer paste is prepared by kneading a conductive material and the above mentioned organic vehicle. As for the conductive material, the above mentioned various conductive metal and alloy, or various oxides, organic metal compound and resinate and the like which become above mentioned conductive material.

The external electrode paste can be prepared as similar with the above mentioned internal electrode layer paste.

A content amount of organic vehicle in the each of the above mentioned paste is not particularly limited, and may be normal content amount, for example, it may be 1 to 5 wt % or so of the binder, 10 to 50 wt % or so of the solvent, Also, in the each paste, additives selected from various dispersant agent, plasticizer, dielectric material, insulation material and the like may be included if needed. A total amount thereof is preferably 10 wt % or less.

When using the printing method, the dielectric layer paste and the internal electrode layer paste are printed on a substrate such as PET and the like and stacking them, and cutting the stack to a predetermined shape, after that, a green chip is obtained by removing from the substrate.

When using the sheet method, a green sheet is formed by using the dielectric layer paste, after printing the internal electrode layer paste thereon, and then, they are stacked so as to obtain a green chip.

Binder removal treatment is performed to the green chip, before firing. As for the binder removal conditions, a temperature rising rate is preferably 5 to 300° C./hr, a holding temperature is preferably 180 to 400° C. and a temperature holding time is preferably 0.5 to 24 hrs. Also, binder removal atmosphere is air or reduced atmosphere.

When firing the green chip, a temperature rising rate is preferably 180° C./hr or below, more preferably 80 to 160° C./hr. The temperature rising rate can be varied gradually as far as it is within the above range. By controlling the temperature rising rate as above mentioned, the area ratio of the non diffusion phase and diffusion phase, and the absolute content ratio of the R element can easily be within the range of the present embodiment. The other conditions are preferably as mentioned below.

A holding temperature at the time of firing is preferably 1000 to 1400° C., more preferably 1200 to 1350° C., and a holding time is preferably 0.5 to 8 hrs, more preferably 1 to 3 hrs. If the holding temperature is below said range, the densification becomes insufficient; and if it exceeds said range, the breakage of the electrode due to the abnormal sintering of the internal electrode layer, the deterioration of the capacitance-temperature characteristic due to the dispersion of the constitution material of the internal electrode layer, or a reduction of the dielectric ceramic composition tend to occur.

An oxygen partial pressure when firing may be suitably decided depending on a kind of the conductive material in the internal electrode layer paste. When using base metal such as Ni or Ni alloy and the like, the oxygen partial pressure in the firing atmosphere is preferably $10^{-14}$ to $10^{-10}$ MPa. If the oxygen partial pressure is below said range, the conducting material of the internal electrode layer may have abnormal sintering which results in a breakage thereof. Also, if the oxygen partial pressure exceeds said range, the internal electrode layer tends to oxidize.

Firing atmosphere is preferably reducing atmosphere, as for an atmosphere gas in the reducing atmosphere, for example, a wet mixture gas of $N_2$ and $H_2$ may be preferably used.

A temperature descending rate is preferably 80 to 200° C./hr.

It is preferable to perform annealing to a capacitor element body, after firing in the reducing atmosphere. The annealing is a treatment for reoxidation of the dielectric layer, and thereby the reliability is improved, because IR lifetime can be made extremely longer.

An oxygen partial pressure in the anneal atmosphere is preferably $10^{-9}$ to $10^{-9}$ MPa. When the oxygen partial pressure is less than the above range, reoxidation of the dielectric layer is difficult, when exceeding the above range, oxidation of the internal electrode layer tends to be progressed.

Also, a holding temperature at the time of annealing is preferably 1100° C. or below, particularly preferably 500 to 1100° C. When the holding temperature is less than the above mentioned range, the dielectric layer may not be sufficiently oxidized, as a result, insulation resistance (IR) is easy to lower and IR lifetime could easily be shortened. On the other hand, when the holding temperature exceeds the above mentioned range, it can be easily occurred that not only reducing a capacitance due to oxidization of the internal electrode layer, but also deterioration of the capacitance temperature characteristic, decreasing IR and reducing IR lifetime. Note that, the annealing can be constituted by the temperature rising process and temperature descending process. Namely, the temperature holding time may be 0. In this case, the holding time is same as a maximum temperature.

As for other annealing conditions, a temperature holding time is preferably 0 to 20 hrs, more preferably 2 to 10 hrs, a temperature descending rate is preferably 50 to 500° C./hr, more preferably 100 to 300° C./hr. Also, as for an atmosphere gas of the annealing, for example, it is preferable to use wet $N_2$ gas and the like.

In the above mentioned binder removal treatment, firing and annealing, in order to wet the $N_2$ gas and mixture gas and the like, for example, a wetter and the like may be used. In this case, a water temperature is preferably 5 to 75° C. or so.

The binder removal treatment, firing and annealing may be performed continuously or individually.

An end face polishing is conducted to a capacitor element body obtained as the above, for example, by barrel polishing or sandblast, and then, an external electrode paste is printed to bake so that an external electrode 4 is formed. Then a covering layer is formed on a surface of the external electrode by plating and the like if needed.

The produced multilayer ceramic capacitor of the present embodiment according to the above is used for various electronic components and the like by mounted on a print circuit board and the like with soldering and the like.

The foregoing has been described with respect to an embodiment of the present invention, however, the present invention is not limited to the above mentioned embodiment at all, and various modifications can be made within a scope of the present invention.

For example, in the above mentioned embodiment, although the multilayer ceramic capacitor as the electronic components applied to the dielectric ceramic composition according to the present invention was exemplified, as for the electronic components to which the dielectric ceramic composition according to the present invention is applied, it is not limited to the multilayer ceramic capacitor, and anything is appropriate as far as has a dielectric layer composed of the above mentioned constitution.

EXAMPLES

Below, the present invention will be explained based on further detailed examples, however, the present invention is not limited to these examples.

Example 1

Firstly, as for raw materials of a main component, $BaTiO_3$ powder was prepared, and as for raw materials other than the main component, $BaZrO_3$, $Gd_2O_3$, $MgCO_3$, $MnO$ and $SiO_2$ were prepared respectively. Note that, the $MgCO_3$ is included as MgO in the dielectric ceramic composition after firing.

Next, the prepared raw materials except for the main component were calcined at 1000° C. These calcined raw materials and the raw material of the main component were wet-mixed during 15 hrs by a ball-mill, after drying the dielectric material was obtained.

Note that, adding amounts of the respective subcomponents in terms of oxide or composite oxide were set as follows: adding amount of $BaZrO_3$ is set as amounts shown in Table 1, adding amount of $Gd_2O_3$ is set as 5.0 mol, adding amount of MnO is set as 4.0 mol, adding amount of $SiO_2$ is set as 2.8 mol and adding amount of MgO is set as 1.2 mol with respect to 100 mol of $BaTiO_3$ which is a main component of the dielectric ceramic composition after firing.

Next, 100 parts by weight of the obtained dielectric material, 10 parts by weight of polyvinyl butyral resin, 5 parts by weight of dioctylphthalate (DOP) as a plasticizer and 100 parts by weight of alcohol as solvent were mixed by a ball-mill and made into a paste so that a dielectric layer paste was obtained.

Also, 44.6 parts by weight of Ni particle, 52 parts by weight of terpineol, 3 parts by weight of ethylcellulose, 0.4 parts by weight of benzotriazole were kneaded by triple roll mill and made into a slurry so that an internal electrode layer paste was obtained.

Then, a green sheet having thickness of 30 μm after drying was formed on a PET film by using the dielectric layer paste prepared in the above. Next, after an electrode layer was printed thereon with a predetermined pattern by using the internal electrode layer paste, a sheet was removed from the PET film so that a green sheet having the electrode layer was made. Next, a plurality of green sheets having the electrode were stacked and adhered by pressure to form a green stacking body. The green stacking body was cut in a predetermined size to obtain a green chip.

Next, the obtained green chip was subject to binder removal treatment, firing and annealing were performed under following mentioned conditions so that a sintered body was obtained.

The binder removal treatment was performed under a condition that a temperature rising rate: 25° C./hr, a holding temperature: 260° C., a holding time: 8 hrs and atmosphere: in the air.

The firing was performed under a condition that a temperature rising rate: 100° C./hr, a holding temperature: 1270° C., a holding time: 3 hrs, a temperature descending rate was same as the temperature rising rate. Note that, an atmosphere gas was wet $N_2+H_2$ mixture gas (1.0% of hydrogen concentration) an oxygen partial pressure was adjusted as being $10^{-12}$ MPa.

The annealing was performed under a condition that a temperature rising rate: 200° C./hr, a holding temperature: 1000° C., a holding time: 2 hrs, a temperature descending rate: 200° C./hr, atmosphere gas: wet $N_2$ gas (oxygen partial pressure $10^{-7}$ MPa). Note that, a wetter was used for wetting the atmosphere gas at the firing and annealing.

Next, after polishing an end face of the obtained sintered body by sandblast, In—Ga was coated as an external electrode so that a multilayer ceramic capacitor sample shown in FIG. 1 was obtained. A size of the obtained capacitor sample was 3.2 mm×1.6 mm×0.6 mm, a thickness of the dielectric layer was 20 μm, a thickness of the internal electrode layer was 1.5 μm, a number of dielectric layer sandwiched by the internal electrode layer was set to 4.

With respect to the obtained each capacitor sample, measures of an area ratio of diffusion phase and non diffusion phase, and an absolute content amount of Gd element as R element were performed by a method shown below. Next, the specific permittivity, high temperature load lifetime and temperature characteristics were measured by a method shown below.

(Measuring Area Ratio of Diffusion Phase and Non Diffusion Phase, and Absolute Content Amount of Gd Element)

Firstly, 50 particles selected at random were observed by a scanning transmission electron microscope (STEM), and performing point analysis on a linear line which through an about center of each surface diffusion particle by using an energy dispersive X-ray spectroscopy method so that X-ray spectrum of the Gd element was measured. An average concentration of the Gd element (C) in said particle was measured from the obtained X-ray spectrum.

(Specific Permittivity ∈s)

For capacitor samples, by digital LCR meter (4284A by YHP), inputting frequency of 1 kHz and input signal level (measured voltage) of 1 Vrms, capacitance C at 25° C. was measured. Then, specific permittivity ∈s (no unit) was calculated based on the thickness of the dielectric layer, effective electrode area and the capacitance C obtained by the measurement. In the present examples, an average value calculated by using 10 capacitor samples is defined as a specific permittivity. The higher specific permittivity is more preferable, 800 or more was considered as good. The results are shown in Table 1.

(High Temperature Load Lifetime)

For the capacitor samples, the life time was measured while applying the direct voltage under the electric field of 50 V/μm at 140° C., and thereby the high temperature load lifetime was evaluated. In the present examples, the lifetime was defined as the time from the beginning of the voltage application until the insulation resistance drops by one digit. Also, this high temperature load lifetime evaluation was performed to 10 capacitor samples. In the present example, 20 hours or longer was considered as good. The results are shown in Table 1.

(Temperature Characteristic of Capacitance)

Temperature characteristic of capacitance was examined whether X7T of EIA standard is satisfied or not. Specifically, capacitance was measured in the temperature range of −55° C. to 125° C. by LCR meter at measured voltage of 1 Vrms so that whether capacitance change rate (criterion temperature: 25° C.) satisfy the range of +22% to −33% or not. In the present examples, −33% or more of capacitance change ratio at 125° C. was considered as good. The results are shown in Table 1.

TABLE 1

| Sample No. | BaZrO₃ [mol] | Averge Concentration of Gd C[wt %] | Area of Non Diffusion Phase S1[%] | Area of Diffusion Phase S2[%] | Absolute Content Ratio of Gd S2 × C[wt %] | Specific Permittivity | High Temp. Load Lifetime [hr] | Temp. Characteristic X7T at 125° C. [%] |
|---|---|---|---|---|---|---|---|---|
| *1 | 7.0 | 7.0 | 28.0 | 72.0 | 5.0 | 884 | 19 | −29.0 |
| 2 | 9.0 | 7.0 | 26.0 | 74.0 | 5.2 | 862 | 29 | −30.0 |
| 3 | 10.0 | 7.0 | 24.0 | 76.0 | 5.3 | 841 | 49 | −31.0 |
| 4 | 11.0 | 7.0 | 22.0 | 78.0 | 5.5 | 823 | 73 | −31.5 |
| 5 | 12.0 | 7.0 | 21.0 | 79.0 | 5.5 | 812 | 82 | −32.5 |
| 6 | 13.0 | 7.0 | 20.0 | 80.0 | 5.6 | 802 | 94 | −33.0 |
| *7 | 14.0 | 7.0 | 15.0 | 85.0 | 6.0 | 778 | 112 | −36.0 |

*shows comparative examples of the present invention

Next, image processing was performed for a mapping image of the Gd element of said particles so that an area where the average concentration of the Gd element is more than one-third is a diffusion phase, an area where the average concentration of the Gd element is one-third or less is a non diffusion phase. Then, from an obtained image after image processing, an area of the non-diffusion phase (S1) and an area of the diffusion phase (S2) were calculated and a ratio thereof was calculated. Next, the average concentration of the Gd element (C) was multiplied to the area of the diffusion phase (S2) obtained in the above so that an absolute content ratio of the Gd element (S2×C) was calculated. The results are shown in Table 1.

From Table 1, by controlling content amount of barium zirconate, the area of diffusion phase can be controlled. As a result, the dielectric ceramic composition which improved reliability with maintaining good specific permittivity and furthermore showed good temperature characteristic (X7T) was obtained.

Example 2

Except for a temperature rising rate is set as a rate shown in Table 2, capacitor samples were made as similar with a sample No. 4 of the example 1, evaluation as similar with the example 1 was made. The results are shown in Table 2.

TABLE 2

| Sample No. | Temp. Rising Rate [° C./h] | Averge Concentration of Gd C[wt %] | Area of Non Diffusion Phase S1[%] | Area of Diffusion Phase S2[%] | Absolute Content Ratio of Gd S2 × C[wt %] | Specific Permittivity | High Temp. Load Lifetime [hr] | Temp. Characteristic X7T at 125° C. [%] |
|---|---|---|---|---|---|---|---|---|
| *8 | 200 | 7.0 | 30.0 | 70.0 | 4.9 | 887 | 17 | −28.0 |
| 9 | 180 | 7.0 | 28.0 | 72.0 | 5.0 | 884 | 20 | −29.0 |
| 10 | 160 | 7.0 | 26.0 | 74.0 | 5.2 | 862 | 29 | −30.0 |
| 11 | 140 | 7.0 | 24.0 | 76.0 | 5.3 | 841 | 49 | −31.0 |
| 4 | 100 | 7.0 | 22.0 | 78.0 | 5.5 | 823 | 73 | −31.5 |
| 12 | 80 | 7.0 | 20.0 | 80.0 | 5.6 | 802 | 94 | −32.0 |
| *13 | 50 | 7.0 | 18.0 | 82.0 | 5.7 | 789 | 104 | −34.5 |

*shows comparative examples of the present invention

From Table 2, the area of diffusion phase can be controlled by controlling the temperature rising rate. As a result, the dielectric ceramic composition which improved reliability with maintaining good specific permittivity and furthermore showed good temperature characteristic (X7T) was obtained.

Example 3

Except for changing the average concentration of the Gd by changing compositional amount of the Gd, capacitor samples were made as similar with the example 1, evaluation as similar with the example 1 was made. The results are shown in Table 3.

TABLE 3

| Sample No. | Temp. Rising Rate [° C./h] | BaZrO₃ [mol] | Averge Concentration of Gd C[wt %] | Area of Non Diffusion Phase S1[%] | Area of Diffusion Phase S2[%] | Absolute Content Ratio of Gd S2 × C[wt %] | Specific Permittivity | High Temp. Load Lifetime [hr] | Temp. Characteristic X7T at 125° C. [%] |
|---|---|---|---|---|---|---|---|---|---|
| *14 | 140 | 11.0 | 7.4 | 30.0 | 70.0 | 5.2 | 862 | 15 | −32.5 |
| *15 | 140 | 11.0 | 6.1 | 28.0 | 72.0 | 4.4 | 911 | 22 | −34.0 |
| 16 | 140 | 11.0 | 6.7 | 28.0 | 72.0 | 4.8 | 891 | 21 | −32.5 |
| 17 | 140 | 11.0 | 7.4 | 28.0 | 72.0 | 5.3 | 847 | 20 | −29.0 |
| *18 | 140 | 11.0 | 8.2 | 28.0 | 72.0 | 5.9 | 791 | 17 | −28.0 |
| *19 | 140 | 11.0 | 5.5 | 22.0 | 78.0 | 4.3 | 907 | 82 | −34.0 |
| 20 | 140 | 11.0 | 6.1 | 22.0 | 78.0 | 4.8 | 899 | 80 | −33.0 |
| 21 | 140 | 11.0 | 6.7 | 22.0 | 78.0 | 5.2 | 845 | 76 | −32.0 |
| 22 | 140 | 11.0 | 7.4 | 22.0 | 78.0 | 5.8 | 812 | 69 | −31.0 |
| *23 | 140 | 11.0 | 8.2 | 22.0 | 78.0 | 6.4 | 775 | 67 | −30.0 |
| *24 | 140 | 11.0 | 5.5 | 20.0 | 80.0 | 4.4 | 897 | 107 | −34.5 |
| 25 | 140 | 11.0 | 6.1 | 20.0 | 80.0 | 4.9 | 878 | 105 | −33.0 |
| 26 | 140 | 11.0 | 6.7 | 20.0 | 80.0 | 5.4 | 851 | 98 | −32.0 |
| *27 | 140 | 11.0 | 7.4 | 20.0 | 80.0 | 5.9 | 794 | 95 | −31.0 |
| *28 | 140 | 11.0 | 7.4 | 18.0 | 82.0 | 6.1 | 771 | 101 | −33.0 |

*shows comparative examples of the present invention

From table 3, in addition for controlling the areas of diffusion phase and non diffusion phase, by controlling an absolute content ratio of the R element, the dielectric ceramic composition which improved specific permittivity, high temperature load lifetime and temperature characteristic was obtained.

What is claimed is:

1. A dielectric ceramic composition comprising;
   a main component composed of one selected from the group consisting of $BaTiO_3$, $(Ba, Ca)TiO_3$, $(Ba, Sr)TiO_3$ and $(Ba, Ca, Sr) TiO_3$,
   an oxide of R element, where R element is at least one selected from the group consisting of Sc, Y, La, Ce, Pr, Nd, Pm, Sm, Eu, Gd, Tb, Dy, Ho, Er, Tm, Yb and Lu, and
   a composite compound including Ba, wherein
   9 to 13 mol of said composite compound in terms of composite compound is included with respect to 100 mol of said main component,
   said dielectric ceramic composition includes surface diffusion particles having surface diffusion structure which is composed of non diffusion phase and diffusion phase existing around said non diffusion phase and including at least said R element,
   in said surface diffusion particle, when an area occupied by said non diffusion phase is defined as S1, and an area occupied by said diffusion phase is defined as S2, S1 and S2 satisfy a relation of S1:S2=20:80 to 30:70 (Note that, except S1=30 and S2=70),
   when an average concentration of said R element in said surface diffusion particle is defined as C, S2 and C satisfy a relation of $4.8 \leq S2 \times C \leq 5.8$.

2. The dielectric ceramic composition as set forth in claim 1, wherein
   said composite component including said Ba is barium zirconate.

3. The dielectric ceramic composition as set forth in claim 1, wherein
   4.5 to 5.5 mol of oxide of said R element in terms of $R_2O_3$ is included with respect to 100 mol of said main component.

4. The dielectric ceramic composition as set forth in claim 2, wherein
   4.5 to 5.5 mol of oxide of said R element in terms of $R_2O_3$ is included with respect to 100 mol of said main component.

5. The dielectric ceramic composition as set forth in claim 1, wherein
with respect to 100 mol of said main component, 2.7 to 5.7 mol of oxide of Mg in terms of MgO is included, 0.5 to 1.5 mol of oxide of at least one element selected from the group consisting of Mn, Cr, Co and Fe in terms of MnO, $Cr_2O_3$, $Co_3O_4$ and $Fe_2O_3$ is included, 3.0 to 3.9 mol of oxide of at least one element selected from the group consisting of Si, Al, Ge, B and Li in terms $SiO_2$, $Al_2O_3$, $GeO_2$, $B_2O_3$ and $Li_2O$ is included.

6. The dielectric ceramic composition as set forth in claim 2, wherein
with respect to 100 mol of said main component, 2.7 to 5.7 mol of oxide of Mg in terms of MgO is included, 0.5 to 1.5 mol of oxide of at least one element selected from the group consisting of Mn, Cr, Co and Fe in terms of MnO, $Cr_2O_3$, $Co_3O_4$ and $Fe_2O_3$ is included, 3.0 to 3.9 mol of oxide of at least one element selected from the group consisting of Si, Al, Ge, B and Li in terms $SiO_2$, $Al_2O_3$, $GeO_2$, $B_2O_3$ and $Li_2O$ is included.

7. The dielectric ceramic composition as set forth in claim 3, wherein
with respect to 100 mol of said main component, 2.7 to 5.7 mol of oxide of Mg in terms of MgO is included, 0.5 to 1.5 mol of oxide of at least one element selected from the group consisting of Mn, Cr, Co and Fe in terms of MnO, $Cr_2O_3$, $Co_3O_4$ and $Fe_2O_3$ is included, 3.0 to 3.9 mol of oxide of at least one element selected from the group consisting of Si, Al, Ge, B and Li in terms $SiO_2$, $Al_2O_3$, $GeO_2$, $B_2O_3$ and $Li_2O$ is included.

8. The dielectric ceramic composition as set forth in claim 4, wherein
with respect to 100 mol of said main component, 2.7 to 5.7 mol of oxide of Mg in terms of MgO is included, 0.5 to 1.5 mol of oxide of at least one element selected from the group consisting of Mn, Cr, Co and Fe in terms of MnO, $Cr_2O_3$, $Co_3O_4$ and $Fe_2O_3$ is included, 3.0 to 3.9 mol of oxide of at least one element selected from the group consisting of Si, Al, Ge, B and Li in terms $SiO_2$, $Al_2O_3$, $GeO_2$, $B_2O_3$ and $Li_2O$ is included.

9. An electric component having a dielectric layer and an electrode layer, wherein
said dielectric layer is composed of the dielectric ceramic composition as set forth in claim 1.

* * * * *